(12) United States Patent
Reddy

(10) Patent No.: US 7,075,669 B2
(45) Date of Patent: Jul. 11, 2006

(54) DOCUMENT PROCESSING SYSTEM AND RELATED METHODS

(75) Inventor: Paul James Reddy, Auckland (NZ)

(73) Assignee: Pharos Systems International, Inc., East Rochester, NY (US)

( * ) Notice: Subject to any disclaimer, the term of this patent is extended or adjusted under 35 U.S.C. 154(b) by 857 days.

(21) Appl. No.: 10/025,823

(22) Filed: Dec. 19, 2001

(65) Prior Publication Data

US 2002/0113993 A1    Aug. 22, 2002

Related U.S. Application Data

(60) Provisional application No. 60/256,356, filed on Dec. 19, 2000.

(51) Int. Cl.
*G06K 15/00* (2006.01)
*G06F 3/12* (2006.01)

(52) U.S. Cl. .............. 358/1.14; 358/1.13; 358/1.15; 358/1.16; 358/296

(58) Field of Classification Search .............. 358/296, 358/1.15, 1.13, 1.16
See application file for complete search history.

(56) References Cited

U.S. PATENT DOCUMENTS

| | | | | |
|---|---|---|---|---|
| 5,130,806 A | * | 7/1992 | Reed et al. | 358/296 |
| 5,287,194 A | * | 2/1994 | Lobiondo | 358/296 |
| 5,787,149 A | | 7/1998 | Yousefi et al. | 379/59 |
| 6,026,380 A | | 2/2000 | Weiler et al. | 705/34 |
| 6,243,548 B1 | | 6/2001 | Hebert et al. | 399/79 |
| 6,563,598 B1 | * | 5/2003 | Johnson et al. | 358/1.15 |

* cited by examiner

*Primary Examiner*—Mark Zimmerman
*Assistant Examiner*—Vincent M. Rudolph
(74) *Attorney, Agent, or Firm*—Allen, Dyer, Doppelt, Milbrath & Gilchrist, P.A.

(57) ABSTRACT

A document processing system may include a document processing device for performing print jobs and copy jobs, a print server for sending print jobs to the document processing device, and a copy station connected to the document processing device and the print server for allowing a user to enable the document processing device to perform a copy job. Furthermore, the copy station may prevent the print server from sending print jobs to the document processing device while the document processing device is enabled for performing a copy job. Additionally, the copy station may also prevent a user from enabling the document processing device to perform a copy job while the document processing device is performing a print job.

34 Claims, 4 Drawing Sheets

DOCUMENT PROCESSING SYSTEM AND RELATED METHODS

RELATED APPLICATION

This application is based upon prior filed provisional application Ser. No. 60/256,356 filed Dec. 19, 2000 now abandoned, the entire subject matter of which is incorporated herein by reference in its entirety.

FIELD OF THE INVENTION

This present invention relates to the field of document processing systems, and, more particularly, to managing document processing system resources to control use of and access to such resources, and to account for resource usage.

BACKGROUND OF THE INVENTION

Modern document processing systems include reprographic machines such as photocopiers, printers, and multi-function devices (MFDs) which combine the functions of both printers, photocopiers and/or fax machines. Printers can be very expensive to run, and even in modern environments where electronic copies of files are usually maintained, there is still a very high demand for paper copies of documents.

There is also an increasing awareness of costs associated with copiers and, as a result, there are a number of systems which attempt to provide an accounting system for copier use. Such prior art systems generally include a copy station that is physically connected to a copier. The copy station runs a software application which provides an authentication function to authenticate a proposed user of the copier. A user may be authenticated, for example, by using a swipe card or entering a user name and possibly some other information such as a cost center or billing code to which the copying is to be charged. Upon authentication, the user may then begin copying.

A foreign device interface (FDI) may be associated with the copier or MFD and physically connected to the copy station. The FDI supplies data regarding the number of copies being made. Generally speaking, the FDI will provide one pulse for one size of paper and two pulses for another size of paper being used by the copier. A signal sent to the FDI by the copy station may be used to disable the copying machine. Therefore, as each copy is made, a signal is sent by the FDI to the copy station, and this is interpreted by the software to provide a cumulative total of copies which have been made.

Typically, an FDI is only capable of distinguishing two types of paper, so very limited information can be provided to the copy station for the purposes of costing the copying job. Yet, it is becoming increasingly common for MFDs and copiers to have a number of other document processing functions or attributes beyond simple copying and printing functions. These further attributes or functions may include, for example, sorting, stapling, binding, color printing, and copying on a variety of different paper types and sizes. Moreover, FDIs typically cannot be used for tracking printing costs either.

SUMMARY OF THE INVENTION

It is therefore an object of the present invention to provide a system and related methods which allow for costing of both print and copy jobs.

This and other objects, features, and advantages of the invention are provided by a document processing system which may include a document processing device for performing print jobs and copy jobs, a print server for sending print jobs to the document processing device, and a copy station connected to the document processing device and the print server for allowing a user to enable the document processing device to perform a copy job. Furthermore, the copy station may prevent the print server from sending print jobs to the document processing device while the document processing device is enabled for performing a copy job (i.e., during a copy session). Additionally, the copy station may also prevent a user from enabling the document processing device to perform a copy job while the document processing device is performing a print job, i.e., it is currently printing or has one or more print jobs pending internally.

More particularly, the document processing device may include a print queue, and the print server may detect whether the document processing device is performing a current print job by polling the print queue. Also, the copy station may determine whether the document processing device is performing a print job by polling the print server.

The document processing system may further include at least one alternate document processing device, and the print server may divert pending print jobs to the at least one alternate document processing device based upon the document processing device being enabled for performing a copy job and based upon the document processing device performing a print job. For example, the print server may divert pending print jobs when a print queue of the document processing device is full. Additionally, the copy station may include a display, and the copy station may cooperate with the print server to display a user message indicating that a pending print job has been diverted to the at least one alternate document processing device.

Each print job and copy job may have a billing code associated therewith, and the copy station may determine a cost associated with each copy job and the print server may determine a cost associated with each print job and assign the cost to the billing code. Further, the document processing device may perform at least one job attribute, and the copy station may detect when the document processing device performs the at least one job attribute and associate an additional cost with the billing code based thereon. By way of example, the at least one job attribute may include sorting, stapling, binding, color printing, printing on predetermined types of paper, and printing on predetermined sizes of paper.

In addition, the copy station may enable the document processing device to perform a copy job based upon receiving a valid billing code from a user. Also, the copy station may include a display for indicating that the document processing device is unavailable for copying, e.g., the document processing device is performing a print job.

A method aspect of the invention is for controlling a document processing device for performing print jobs and copy jobs. The method may include preventing a user from enabling the document processing device to perform a copy job when the document processing device is performing a print job. The method may further include preventing print jobs from being sent to the document processing device to be performed when the document processing device is enabled for performing a copy job (i.e., during a copy session).

Yet another aspect of the invention is for a computer-readable medium having computer-executable instructions for performing steps for controlling a document processing device, the document processing device for performing print jobs and copy jobs. The steps may include preventing a user from enabling the document processing device to perform a copy job when the document processing device is performing a print job, and preventing print jobs from being sent to the document processing device to be performed when the document processing device is enabled for performing a copy job (i.e., during a copy session).

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and double prime notation are used to indicate similar elements in alternative embodiments.

The following terms will be used throughout and are defined here for convenience. "Multi-function device" or "MFD" refers to a document processing device that can process print and copy instructions. "Attribute" refers to one or more functions that a document processing device may perform apart from printing or copying. Attributes may include, but are not limited to, paper size selections, bind, collate, color, fold, duplex, laminate, manual feed, staple, trim, and tumble.

Figure 1:
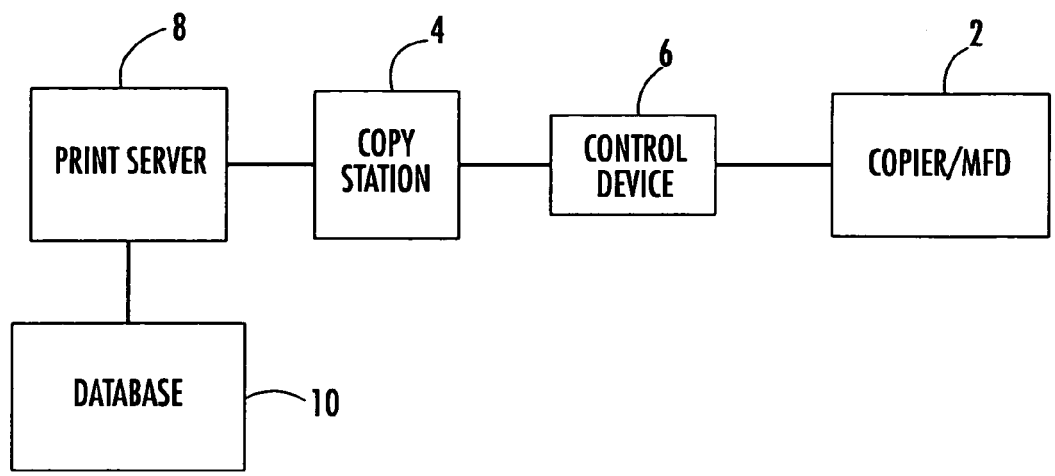
FIG. 1 is a schematic block diagram of a print/copy control system according to the present invention.

Referring now to FIG. 1, an overall schematic block diagram of a system for controlling usage of one or more document processing devices, such as a photocopier or a multi-function device (MFD) 2, is shown. The system illustrated in FIG. 1 allows access to the copiers or MFDs 2 to be managed, and copy usage reported. In the case of MFDs, the printing and copying functions of such devices are managed so as not to conflict with each other.

The copiers and/or MFDs 2 are each in communication with at least one copy station 4 via a control device 6. A print server 8 is provided as part of a local area network to which the copy station 4 is also connected, and the print server (or another machine on the network) has access to the database 10.

The print server 8 may typically be a personal computer running the appropriate software according to the present invention to control the routing of copy/print jobs to the appropriate copier, printer, or MFD 2, as well as costing and optionally charging for those jobs. The database 10 may be used to store all transaction records, user accounts, and system configuration details, for example.

The copy station 4 is the device to which users log on to activate the copier/MFD 2. A copy station is often, but not necessarily, a dedicated personal computer running the appropriate software to interface with a control device. In practice, users may also be able to use the copy station 4 for other functions, such as releasing print jobs or account maintenance, for example.

The control device 6 is a device that is physically plugged and/or wired into the copier/MFD 2 and monitors the internal states of such document processing machine. The copy station 4 controls the copier/MFD through the control device 6. The copy station 4 and control device 6 may be separate devices, but they may also be included in a single physical device. Of course, those of skill in the art will appreciate that the above described hardware is exemplary, and that numerous other devices are available which may be used to implement the invention.

Figure 2:
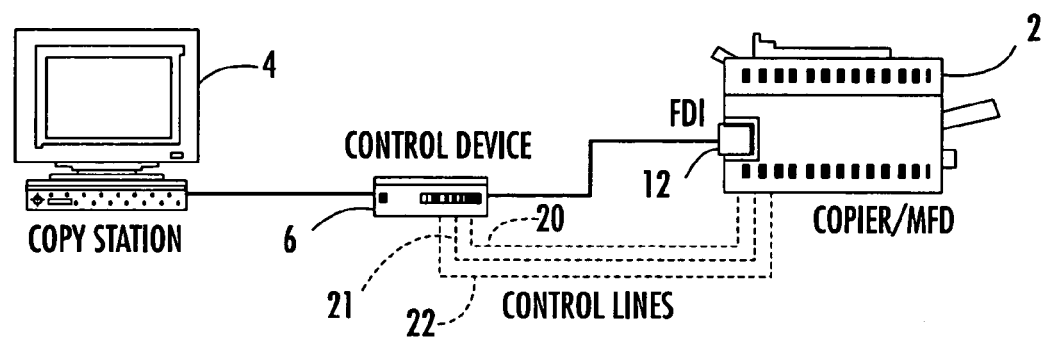
FIG. 2 is a more detailed schematic diagram illustrating the interconnection between the copy station, control device, and document processing device of FIG. 1.

Copier control will now be described with reference to FIGS. 2 and 3. Turning to FIG. 2, the connection between the control device 6 and the copier/MFD 2 is shown in greater detail. In practice, a user logs on to the copy station 4 and selects a copier or MFD that he/she wishes to use. Therefore, there may be only the one copier or MFD 2 controlled by the copy station 4, or there may be a number of copier/MFD machines. To log on to the copy station 4, the software loaded on the copy station requires the user to authenticate him or herself. That is, a user will usually be required to provide a pin number, password, billing number, etc., so that the system can authenticate the user and allow for the accounting of system resources.

More particularly, the copy station 4 may "hand off" the password, billing number, etc. to the print server 49 (FIG. 6) where it may be authenticated against a database server, or software "plug-in" modules may be used for communicating with authentication/billing servers, for example. Once the user has logged on and selected the appropriate copier/MFD 2 (if required), the copy station 4 enables the selected document processing device and the user can begin the document processing function, which in this example is copying.

The control device 6 is typically physically connected to the copy station 4 by being connected to a serial port on the copy station. The typical communication protocol used is RS-232, as will be appreciated by those skilled in the art. The control device 6 is physically connected to the copier/MFD 2 through the copier/MFD's foreign device interface (FDI) 12.

Figure 3:
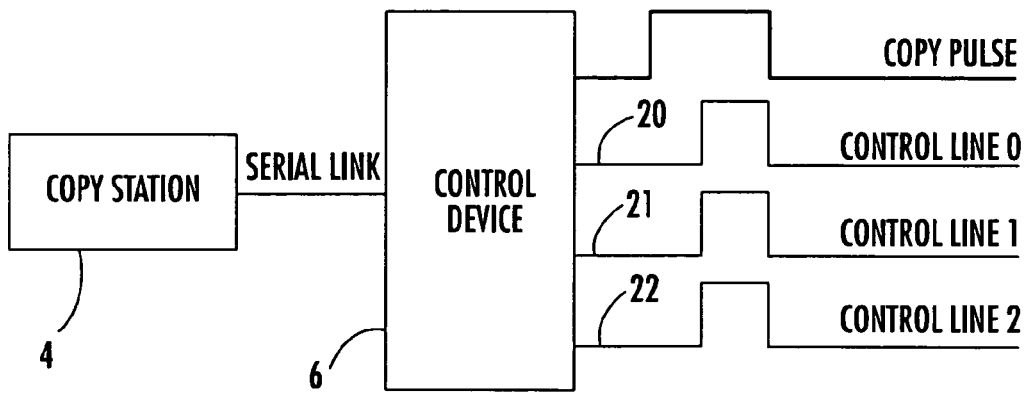
FIG. 3 is a schematic block diagram illustrating signals on the control lines of FIG. 2.

A pulse (referred to herein as a "copy pulse") is received from the FDI each time a copy is made (FIG. 3). The FDI 12 may be standard for a various brand or makes of copier/MFD 2 and allows the device to be activated or deactivated. However, FDIs typically cannot be used to track usage of attributes, nor for print tracking.

With the present invention, the control device 6 may include multiple control lines. As illustrated in the example of FIG. 2, three further control lines 20, 21 and 22 are included. The control lines 20, 21 and 22 run from the control device 6 to the copier/MFD 2, and allow copy job attributes to be monitored. This is achieved by having each control line 20, 21 and 22 set to detect a different job attribute on the copier/MFD 2. Thus, each of the control lines 20, 21 and 22 is electrically connected to a different part of the copier/MFD 2 control circuitry so that a known signal is present on each of the control lines when a certain attribute or combination of attributes is being used.

In this way, each control line 20, 21 and 22 can be set to detect a different job attribute, and by reading the value of each copy pulse (typically a high or low signal), more detailed information on the properties of the copy job can be determined. Since there are three control lines 20, 21, 22 with two possible values each (high or low) in the example, there are eight possible combinations of attributes that can be detected.

Referring now to FIG. 3, a schematic representation of the signals sent on the control lines 20, 21 and 22 between the control device 6 and the copier/MFD 2 is shown. As may be seen, the voltage present on the control lines 20, 21, 22 varies over time depending upon the various functions that the copier/MFD 2 is performing, and these variations are represented by the high and low signals in the diagram of FIG. 3.

It will also be seen that the control device 6 performs the function of receiving the control line data and then providing the information over the serial link to a serial communications port on the copy station 4. This allows the copy station 4 to interpret the serial information, look up the attributes that correspond with that information, and record what has occurred for billing and transaction recording purposes. This occurs online, so that the user can immediately be informed of the cost of the job that has been performed, and the particular account specified by the user may be updated accordingly.

It should be noted that although only three control lines 20, 21 and 22 and the FDI control line are illustrated in FIGS. 2 and 3, those of skill in the art will appreciate that the system could be expanded by the addition of further control lines to thereby increase the number of attributes which can be tracked by the system.

Figure 4:
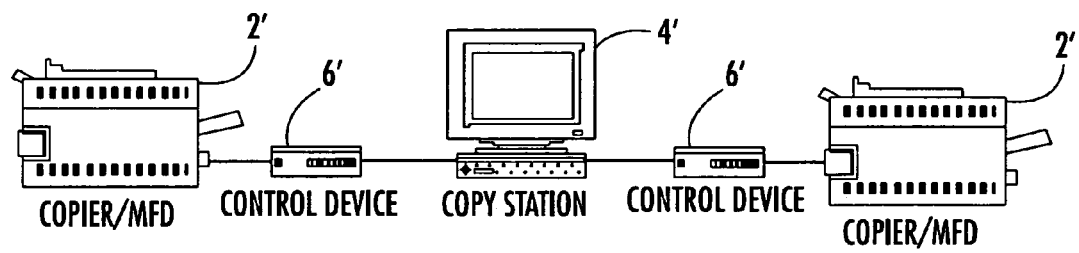
FIG. 4 is schematic diagram illustrating an alternate embodiment of the control system of FIG. 1 including a copy station connected to two document processing devices.
Figure 5:
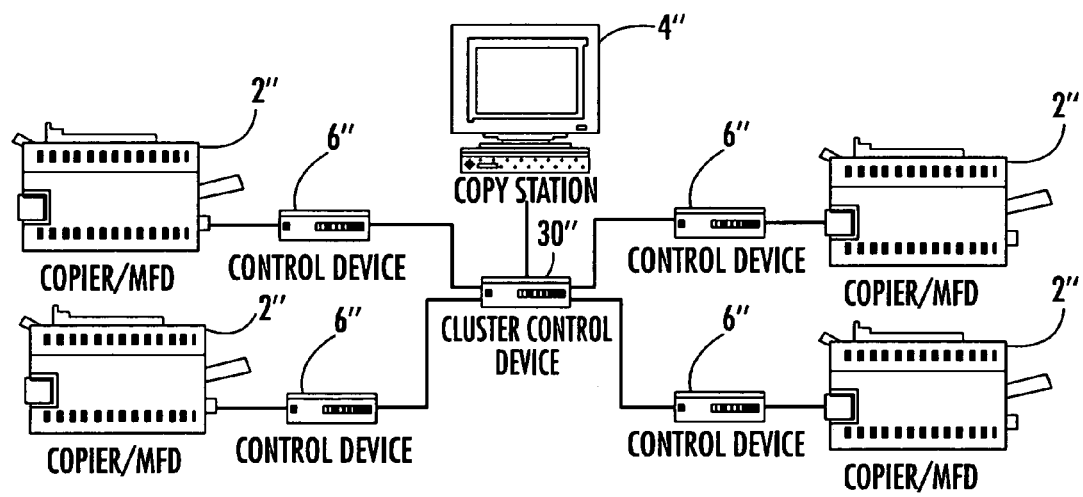
FIG. 5 is a schematic diagram illustrating another alternate embodiment of the control system of FIG. 1 including a copy station connected to four document processing devices.

Examples of alternate control system configurations are illustratively shown in FIGS. 4 and 5. Copy stations, control devices and copiers can be connected to one another in a number of different configurations, depending upon the type of devices that are being used. A control device 6 as described above is typically designed to control only one copier/MFD device, but as will be described below, it is possible to have a copy station 4 connected to multiple control devices, and therefore multiple copiers.

Referring to FIG. 4, a copy station 4' may be connected to multiple copier/MFDs 2' depending upon the number of serial ports that the copy station can support. In the example shown in FIG. 4, the copy station 4' has two available serial ports, each of which communicate with a respective control device 6' to thereby communicate with the copier/MFDs 2'. Typically a copy station 4', such as a personal computer, will support up to a maximum number of serial ports (typically six), and this in turn determines the number of copier/MFDs 2' that the copy station may support. Of course, multiple copy stations 4' can be connected into a local area network, as will be appreciated by those of skill in the art.

Another alternate arrangement is shown in FIG. 5 in which a cluster controller 30" can be used to connect a single port on a copy station 4" with up to six control devices 6", for example. The communication protocol used in the arrangement shown in FIG. 5 may be the RS-485 protocol, for example.

An example of a control device 6" which may be used to implement the present invention is manufactured by Bear Solutions (Australasia) Pty Limited and is commonly referred to as a "bear pod." Bear Solutions also manufactures a cluster control device, commonly referred to as a "bear cluster controller," which may be used for implementing the cluster control device 30". Of course, those skilled in the art will appreciate that other suitable devices may also be used.

An example of a control device 6 which may be used in accordance with the invention is an XCP network transaction station (NTS) control device. An XCPNTS is a small terminal with a keypad and LCD display that connects to the network and wires directly into the copier. This arrangement provides a copy station and a control device in a single physical unit. An NTS device can typically control only one copier/MFD.

Here again, those skilled in the art will appreciate that other forms of control devices 6 may be used, which may either be a separate physical unit or part of a copy station. The basic function of the control device 6 is to provide an interface between the copier/MFD 2 and the network. The present invention makes use of not only the FDI 12, but also further physical connection points that enable electronic signals representative of copier/MFD attribute functions to be accessed.

More particularly, the control device 6 may be connected to the FDI 12 by a cable harness. This is an electrical cable with connectors that are connected to the appropriate pin outs on the FDI 12. Since copiers can differ widely between brands and models, the copier's instruction/use manual may need to be consulted to determine which pin outs relate to which attributes, and therefore how to construct the cable harness.

The control of multifunction devices according to the present invention will now be described with reference to FIGS. 6 to 8. One of the main factors that needs to be taken into account to efficiently control the usage of an MFD device in a document processing system is to know whether the MFD is in a copying state or printing state at all times. This is so that document processing jobs can be costed and charged at the correct rate and to the correct account, and to be able to arbitrate between copy and print jobs. According to the present invention, the status of the MFD's internal printer queue 48 is polled and the MFD is only shown as being available for copying if there are no jobs waiting in its queue.

Typically, MFDs operate in one of two modes, namely a printing mode or copying mode. Most MFDs prioritize copying over printing. This is because if an MFD is being used for copying the user will typically be standing by the copier while it is being used. On the other hand, print jobs are more likely to have been sent remotely over the network, so the owner of the job is less likely to be standing by the MFD waiting for that job to print.

Prioritization of copying over printing first involves enabling printing to be interrupted to allow for copying. Depending on the MFD, printing can usually either be interrupted between jobs, or between pages of a single job. Furthermore, copying is prevented from being interrupted to allow a job to print, i.e., print jobs cannot be performed until the user has finished copying.

More particularly, the user may indicate at the copy station 4 that he is finished with the copier. The copier may immediately become available for other print or copy activities. Since a copy station 4 can manage many devices, the user may be logged off of the copy station, although it does keep track that the user is on the MFD. The user can then quickly select the appropriate MFD and indicate that his session is over. Of course, many MFDs also have an inactivity timeout in the event the user forgets to indicate that the session is over. The inactivity timeout is the time an MFD must sit idle following copying before becoming available to accept print jobs. The copy station may similarly have an inactivity timeout.

According to the present invention, the pages of print/copy jobs are counted so that the cost of these jobs can be tracked, recorded, costed, and optionally charged to the appropriate entity. A problem in performing these tasks is distinguishing between a copy job or a print job. This is due to the fact that MFDs generally only count pages as they enter the printer fuser (the part of the MFD that physically prints the jobs onto paper), without distinguishing whether a copy job or a print job is taking place. Since copy jobs and print jobs may involve different charging rates, it can be important to distinguish between them.

In accordance with the present invention, this problem is addressed by taking control of when the MFD is available for copying and when it is available for printing. Since the invention determines what actions (printing or copying) the MFD is available for, it always knows whether the MFD is printing or copying, and therefore knows how to charge the pages being counted at any given time.

Figure 6:
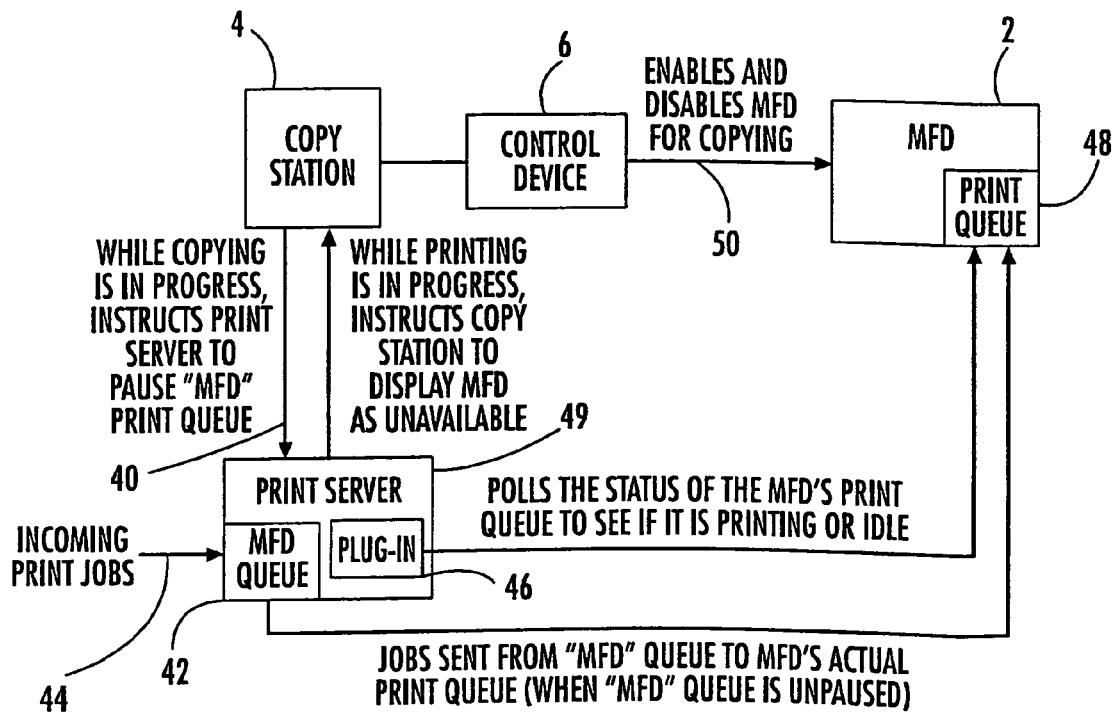
FIG. 6 is a more detailed schematic block diagram of the system of FIG. 1 illustrating control of an MFD.

Referring to the example illustrated in FIG. 6, to perform a copying job, the user, after authentication, selects the MFD device for a copying job. The copy station 4 then instructs the print server 49 to pause the server MFD print queue 42, as illustratively shown by an arrow 40. With the MFD print queue 48 in a paused state, any new incoming (i.e., pending) print jobs 44 that arrive at the print server 49 may either be held at the print server until a copying job is finished, or routed to another printer (if one is available).

The print server 49 monitors the status of the MFD 2 by polling the MFD print queue 48 to determine whether the MFD is printing or is idle. The print server 49 may include a plug-in 46 for this purpose, for example. Once the print jobs that are currently being printed (if any) have finished, the MFD 2 will be available for copying, and the control device 6 will enable the MFD for copying, as illustratively shown by arrow 50.

After the copying job is finished (i.e., the user has been logged off from the copy station 4), the control device disables the MFD 2 for copying and the copy station 4 takes the server MFD queue 42 off of the pause state. While printing, the MFD 2 is displayed as "unavailable" to users at the copy station, and users are not able to enable the MFD for copying until the printing is finished.

Because neither copying nor printing are possible unless allowed by the system, the system always knows what mode the MFD 2 is in. Therefore, the system knows whether the page being counted is for a copy job or a print job. More particularly, print jobs may be counted at the print server 49, prior to ever reaching the MFD/printer 2. Thus, the print jobs may be counted (including attributes), costed and charged in advance of the print activity. While the MFD 2 is idle, it can be used for printing or copying, but as soon as it is put to use in one capacity, it is may not be used in the other capacity until the job in progress has been completed.

Figure 7:
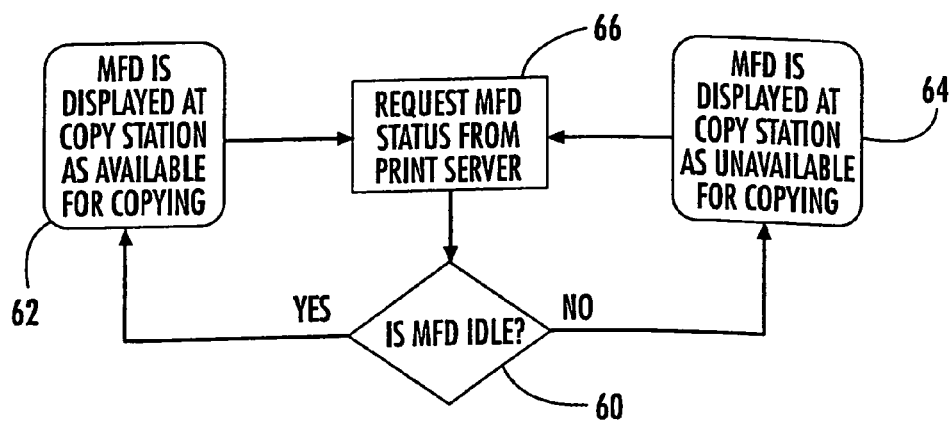
FIG. 7 is a flow diagram illustrating determination of the availability of an MFD for copying according to the present invention.

Turning to FIG. 7, a flow chart which describes the steps taken by the system to control copying of the MFD 2 is shown. A first step (Block 60) is to decide whether the MFD 2 is idle or not. If the MFD 2 is idle, then a message is displayed at the copy station that the MFD is available for copying, at Block 62. Thus a user may activate the MFD for copying at a copy station 4 and begin making copies. On the other hand, if the MFD 2 is not idle, then a message is displayed at the copy station 4 that the MFD is unavailable for copying, at Block 64, and the MFD cannot be enabled for copying until the MFD's print queue 48 is empty.

When the user logs onto a copy station 4 for copying, the copy station sends a request to the system print server 49 for it to poll the status of the MFD's internal printer queue 48, at Block 66. If the MFD print queue 48 is empty (i.e., the MFD 2 is idle), it informs the copy station 4 that the MFD is available for copying. If there are any jobs in the MFD print queue 48, it informs the copy station 4 that the MFD 2 is unavailable.

The polling operation may be performed by the plug-in 46 to the print server 49, as described above. This may be any executable or scripted program that determines the state of the MFD's print queue 48, for example. By default, the system may use a scripted plug-in that calls a relatively small utility program (commonly referred to as LPQ) installed when TCP/IP is installed on a computer. The plug-in is called to query the MFD 2 as to the status of its print queue 48. Of course, other suitable techniques for determining the status of the MFD's print queue 48 may also be used.

Based on the status string returned by the LPQ program, the plug-in returns the status of the print queue 48 to the printer server 49. The status string returned by LPQ will include either: (a) details of the job currently being printed (job name, name of the user that sent it, etc); or (b) a message indicating that the print queue 48 is empty (most commonly a "no entries" message). The system default script checks to see if "no entries" is returned. If this is the case, the print queue 48 is empty and the MFD 2 is available for copying. Otherwise, the MFD 2 is printing and is therefore unavailable for copying. For MFD's that return a message other than "no entries" when idle, the script may be edited accordingly, which is a relatively simple task.

When the MFD 2 is not being used for copying, the copy station 4 will determine whether or not it can be used for copying. If the MFD 2 is actually being used for copying, the copy station 4 may instruct the print server 49 to pause its internal MFD print queue 42, where print jobs to be sent to the MFD are held. That is, print jobs sent to the print server 49 will not be printed at the MFD 2 until the queue unpauses (see below), and there is no need for the copy station 4 to request the MFD's status.

The copy station 4 is used to start copy sessions and to end them. As noted above, the user does not stay logged on to the copy station 4 during a copy station, but the copy station does keep track of which user is using which device. For a copy station 4 managing several MFDs 2, the copy station may show the states of all MFDs (e.g., printing, copying, available). The user may then pick an available MFD 2 and is asked to log in. The copier/MFD 2 is reserved for the user, and the copy station 4 goes back to the display of all MFD states. The user may then perform his copying, and other users may use the copy station 4 to enable other copiers. When the user is finished, he may then go back to the copy station 4, select the copier/MFD he was using and end the session.

When the user ends his/her copying session (either by logging off the copying station 4, or if the copy station times out), the system waits for a short length of time for another user to begin copying before releasing the MFD 2 as available for printing or copying. This "timeout" can be adjusted to various lengths. If the timeout is set to zero, then as soon as a user finishes copying the MFD 2 will be available for printing. In this case, if there are any jobs waiting to print on the MFD 2, they will begin printing directly, and the MFD will not be available for copying.

To enable a document processing system to operate more efficiently, the present invention allows print jobs normally destined for a selected MFD 2 to be diverted to another printer (e.g., another MFD) if that selected MFD is unavailable. Because MFDs 2 in accordance with the system are only enabled for copying if done so at the relevant copy station 4, the system always knows when an MFD is in a copying mode. If it is in a copying mode, the system may direct print jobs to printers/MFDs other than the selected MFD 2. If no other printers are available, then the print job may be held at the print server 49 until copying is finished.

Figure 8:
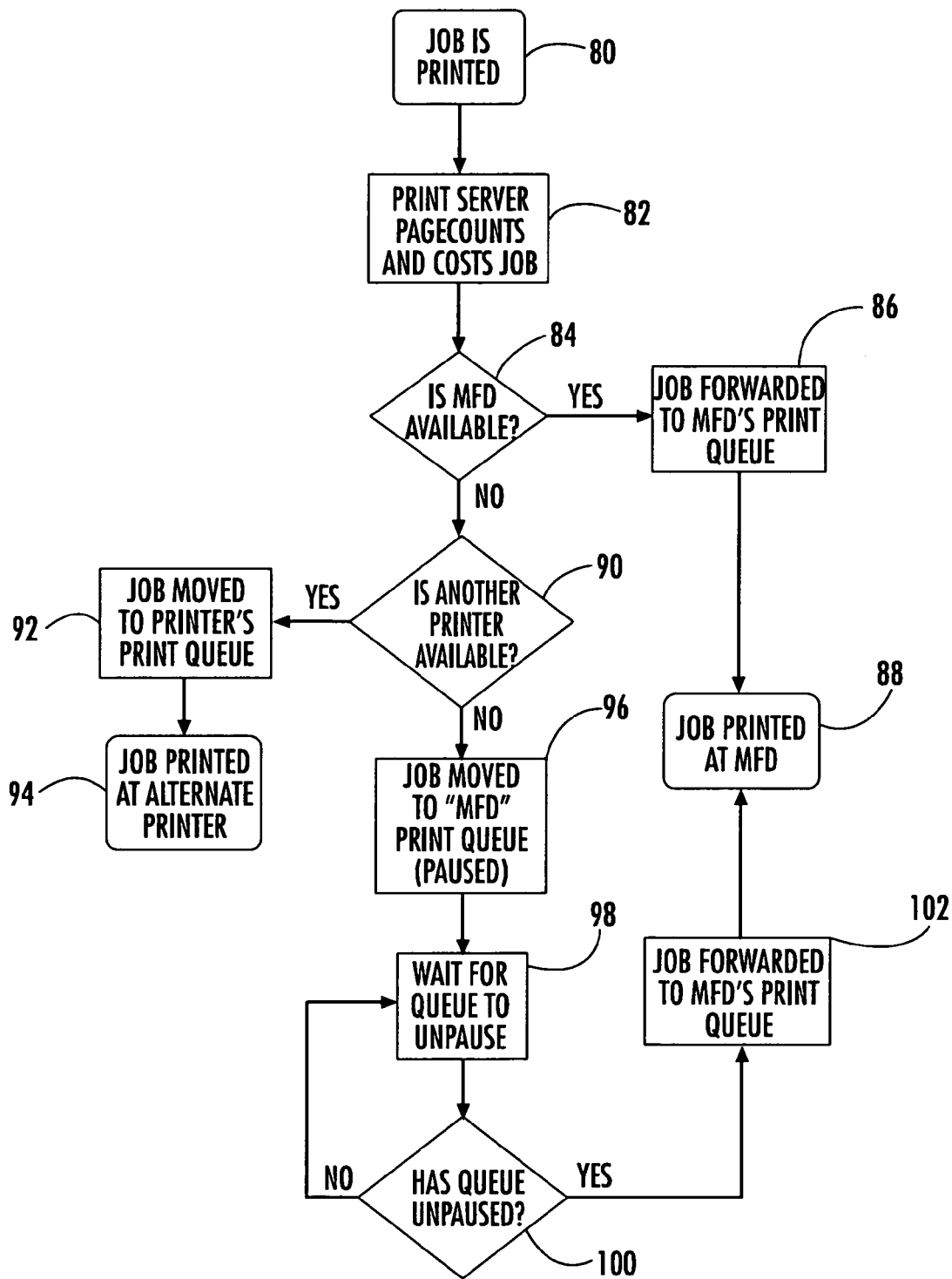
FIG. 8 is a flow diagram for distributing print jobs in the document processing system of the present invention.

More particularly, the process begins by a user making a print request, at Block 80 (FIG. 8). The job is forwarded to the print server 49, which counts the number of pages that will need to be printed and (optionally) the attributes requested, and from this the cost of the print job may be determined (Block 82). The system then queries whether the MFD is available, at Block 84. If it is available, then the job is forwarded to the MFD print queue 48 (Block 86), and the job is then printed, at Block 88.

If the MFD 2 is unavailable, then the system queries whether another printing device is available, at Block 90. If another device is available, then the job is moved to the other printer's print queue (Block 92) and the job is printed on the alternate printer, at Block 94. The system may advantageously inform the user at the copy station 4 that their job has been re-routed, for example.

However, if no other alternate printer is available, then the job is moved to the server MFD print queue 42, at Block 96. Since the MFD print queue 42 is paused, the system then waits for the print queue to unpause, at Blocks 98 and 100. When the print queue 42 has unpaused, the job is forwarded to the MFD's print queue 48 (Block 102), following which the job is printed at the MFD 2.

Those of skill in the art will appreciate that the system according to the present invention provides numerous advantages. For example, print jobs can be arbitrated by the system to ensure that the print job is performed in a timely manner by bypassing multifunction devices which are being used for copying. The system also has a significant advantage of providing an accounting function for ascertaining the cost of attributes associated with copying, i.e., providing costs for features which is not possible with prior art systems. As noted above, such prior art systems typically only distinguish between two different types of paper and therefore do not provide any cost information about the use of other resource attributes such as stapling, binding, color copying etc. Furthermore, the system allows multifunctional devices to be effectively integrated into document processing systems by being able to discriminate between an MFD that is being used for printing or copying functions.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A document processing system comprising:
   a document scanner;
   a document processing device for cooperating with said document scanner to perform copy jobs, and also for performing print jobs;
   a print server for sending print jobs to said document processing device; and
   a copy station connected to said document processing device, said document scanner and said print server for allowing a user to enable said document processing device and said document scanner to perform a copy job;
   said copy station preventing said print server from sending print jobs to said document processing device while and said document scanner is enabled for performing a copy job, and said copy station also preventing a user from enabling said document scanner while said document processing device is performing a print job.

2. The document processing system of claim 1 wherein said document processing device comprises a print queue, and wherein said print server detects whether said document processing device is performing a current print job by polling said print queue.

3. The document processing system of claim 1 wherein said print server detects whether said document processing device is performing a print job, and wherein said copy station determines whether said document processing device is performing a print job by polling said print server.

4. The document processing system of claim 1 further comprising at least one alternate document processing device, and wherein said print server diverts pending print jobs to said at least one alternate document processing device based upon at least one of the document processing device and the document scanner being enabled for performing a copy job and based upon the document processing device performing a print job.

5. The document processing system of claim 4 wherein said copy station comprises a display, and wherein said copy station cooperates with said print server to display a user message indicating that a pending print job has been diverted to said at least one alternate document processing device.

6. The document processing system of claim 1 wherein each copy job has a billing code associated therewith, and wherein said copy station determines a cost associated with each copy job and assigns the cost to the billing code.

7. The document processing system of claim 6 wherein said document processing device performs at least one job attribute, and wherein said copy station detects when said document processing device performs the at least one job attribute and associates an additional cost with the billing code based thereon.

8. The document processing system of claim 7 wherein said at least one job attribute comprises sorting, stapling, binding, color printing, printing on predetermined types of paper, and printing on predetermined sizes of paper.

9. The document processing system of claim 1 wherein each print job has a billing code associated therewith, and wherein said print server determines a cost associated with each print job and assigns the cost to the billing code.

10. The document processing system of claim 1 wherein said copy station enables said document processing device to perform a copy job based upon receiving a valid billing code from a user.

11. The document processing system of claim 1 wherein said copy station comprises a display for indicating that said document processing device is unavailable for copying.

12. A document processing system comprising:
   a document scanner;
   a primary document processing device for cooperating with said document scanner to perform copy jobs, and also for performing print jobs;
   at least one alternate document processing device for performing at least one of print jobs and copy jobs;
   a print server for sending print jobs to said primary and at least one alternate document processing devices; and
   a copy station connected to said document processing device and said print server for allowing a user to enable said primary document processing device and said document scanner to perform a copy job based upon receiving a valid billing code from the user;
   said copy station preventing said print server from sending print jobs to said primary document processing device while said document scanner is enabled for performing a copy job;
   said copy station also preventing a user from enabling said document scanner while said primary document processing device is performing a print job;
   said print server diverting pending print jobs to said at least one alternate document processing device based upon at least one of said primary document processing device and said document scanner being enabled for performing a copy job and based upon said primary document processing device performing a print job.

13. The document processing system of claim 12 wherein said primary document processing device comprises a print queue, and wherein said print server detects whether said primary document processing device is performing a current print job by polling said print queue.

14. The document processing system of claim 12 wherein said print server detects whether said primary document processing device is performing a print job, and wherein said copy station determines whether said primary document processing device is performing a print job by polling said print server.

15. The document processing system of claim 12 wherein said copy station comprises a display, and wherein said copy station cooperates with said print server to display a user message indicating that a pending print job has been diverted to said at least one alternate document processing device.

16. The document processing system of claim 12 wherein said copy station determines a cost associated with each copy job and assigns the cost to the billing code.

17. The document processing system of claim 16 wherein said primary document processing device performs at least one job attribute, and wherein said copy station detects when said primary document processing device performs the at least one job attribute and associates an additional cost with the billing code based thereon.

18. The document processing system of claim 17 wherein said at least one job attribute comprises sorting, stapling, binding, color printing, printing on predetermined types of paper, and printing on predetermined sizes of paper.

19. The document processing system of claim 12 wherein each print job has a billing code associated therewith, and wherein said print server determines a cost associated with each print job and assigns the cost to the billing code.

20. The document processing system of claim 12 wherein said copy station comprises a display for indicating that said primary document processing device is unavailable for copying.

21. A method for controlling a document processing device for performing print jobs and for cooperating with a document scanner for performing copy jobs, the method comprising:
   preventing a user from enabling the document scanner when the document processing device is performing a print job; and
   preventing print jobs from being sent to the document processing device to be performed when the document scanner is enabled for performing a copy job.

22. The method of claim 21 further comprising diverting pending print jobs to an alternate document processing device based upon at least one of the document processing device and the document scanner being enabled for performing a copy job and based upon the document processing device performing a print job.

23. The method of claim 22 further comprising providing a message to a user when a pending print job has been diverted to the at least one alternate document processing device.

24. The method of claim 21 wherein each print job and copy job has a billing code associated therewith, and further comprising determining a cost associated with each copy job and print job and assigning the cost to the billing code.

25. The method of claim 24 wherein the document processing device performs at least one job attribute, and further comprising detecting when the document processing device performs the at least one job attribute and associating an additional cost with the billing code based thereon.

26. The method of claim 25 wherein the at least one job attribute comprises sorting, stapling, binding, color printing, printing on predetermined types of paper, and printing on predetermined sizes of paper.

27. The method of claim 21 further comprising providing a user with a message indicating that the document processing device is unavailable for copying.

28. A computer-readable medium having computer-executable instructions for performing steps for controlling a document processing device for performing print jobs and for cooperating with a document scanner for performing copy jobs, the steps comprising:
   preventing a user from enabling the document scanner when the document processing device is performing a print job; and
   preventing print jobs from being sent to the document processing device to be performed when the document scanner is enabled for performing a copy job.

29. The computer-readable medium of claim 28 having further computer-executable instructions for performing a step of diverting pending print jobs to an alternate document processing device based upon at least one of the document processing device and the document scanner being enabled for performing a copy job and based upon the document processing device performing a print job.

30. The computer-readable medium of claim 29 having further computer-executable instructions for performing a step of providing a message to a user when a pending print job has been diverted to the at least one alternate document processing device.

31. The computer-readable medium of claim 28 wherein each print job and copy job has a billing code associated therewith, and wherein the computer-readable medium further comprises computer-executable instructions for performing a step comprising determining a cost associated with each copy job and print job and assigning the cost to the billing code.

32. The computer-readable medium of claim 31 wherein the document processing device performs at least one job attribute, and wherein the computer-readable medium further comprises computer-executable instructions for performing steps comprising detecting when the document processing device performs the at least one job attribute and associating an additional cost with the billing code based thereon.

33. The computer-readable medium of claim 32 wherein the at least one job attribute comprises sorting, stapling, binding, color printing, printing on predetermined types of paper, and printing on predetermined sizes of paper.

34. The computer-readable medium of claim 28 having further computer-executable instructions for performing a step of providing a user with a message indicating that the document processing device is unavailable for copying.

* * * * *